US006291618B1

(12) United States Patent
Silvis et al.

(10) Patent No.: US 6,291,618 B1
(45) Date of Patent: Sep. 18, 2001

(54) PHOSPHAZENE AZIDE COUPLING AGENTS AND THEIR USE IN RHEOLOGY MODIFICATION OF POLYMERS

(75) Inventors: H. Craig Silvis, Midland, MI (US); Michael B. McIntosh, Lake Jackson, TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/698,875

(22) Filed: Oct. 27, 2000

Related U.S. Application Data

(60) Provisional application No. 60/172,104, filed on Dec. 23, 1999.

(51) Int. Cl.[7] ............... C08F 130/02; C08G 79/02
(52) U.S. Cl. ............... 526/278; 526/275; 526/276; 525/538; 524/138; 524/139; 524/708; 528/168
(58) Field of Search .................... 526/278, 275, 526/276; 525/538; 524/138, 139, 708; 528/168

(56) References Cited

U.S. PATENT DOCUMENTS

| 3,058,994 | 10/1962 | Schrage . |
| 3,336,268 | 8/1967 | Cox . |
| 3,530,108 | 9/1970 | Oppenlander . |
| 4,124,557 | * 11/1978 | Dieck et al. ............ 528/168 |
| 6,143,829 | 8/1998 | Babb et al. . |

FOREIGN PATENT DOCUMENTS

WO 00/71589 * 11/2000 (WO) .

OTHER PUBLICATIONS

Tetrahedon, 1985, vol. 41(8), pp. 1509–1516.
J. Org. Chem., 1977, vol. 42(17), pp. 2920–2926.
J. Org. Chem. 1975, vol. 40(7), pp. 883–889.
Proc. XIIth International Congress on Rheology, Aug. 1996, pp. 7–10, J. Meissner.
Rheol. Acta, 1994, vol. 33, pp. 1–21.
J. Rheol. 1994 vol. 38(3), pp. 573–587.
J. Am. Chem. Soc. 1999, vol. 121, pp. 884–885.
Inorg. Chem., 1999, vol. 38, pp. 5535–5544.

* cited by examiner

Primary Examiner—James J. Seidleck
Assistant Examiner—Olga Asinovsky

(57) ABSTRACT

The present invention relates to cyclic phosphazene azides and their use in a process for producing a rheology modified polymer which comprises contacting a polymer with a cyclic phosphazene azide at a temperature which is at least the decomposition temperature of the cyclic phosphazene azide. When the cyclic phosphazene azide reacts with the polymer, at least two separate polymer chains are advantageously joined and the molecular weight of the polymer chain is increased.

18 Claims, No Drawings

PHOSPHAZENE AZIDE COUPLING AGENTS AND THEIR USE IN RHEOLOGY MODIFICATION OF POLYMERS

CROSS REFERENCE STATEMENT

This application claims the benefit of U.S. Provisional Application No. 60/172,104, filed Dec. 23, 1999.

This invention relates to coupling agents and their use in coupling of polymer chains, more particularly to the coupling of polymer chains with phosphazene azides.

BACKGROUND

Polymers have been reacted with various polyfunctional compounds capable of insertion reactions into C—H bonds. Such polyfunctional compounds having at least two functional groups capable of C—H insertion reactions are referred to herein as C—H insertion compounds. Those skilled in the art are familiar with such reactions and the functional groups associated therewith. For example, carbenes, as generated from diazo compounds, are disclosed in Tetrahedron, (1985), 41(8), pages 1509–1516, and nitrenes, as generated from azides, are disclosed in J. Org. Chem., (1977), 42(17), 2920–6, and J. Org. Chem., (1975), 40(7), 883–9. C—H insertion compounds include compounds such as alkyl and aryl azides (R—N3), acyl azides (R—C(O)N3), azidoformates (R—O—C(O)—N3), phosphoryl azides ((RO)2-(PO)—N3), phosphinic azides (R2-P(O)—N3), silyl azides (R3—Si-N3) and sulfonyl azides (R—SO2-N3).

Sulfonyl azides are reported to be useful for a variety of purposes including polymer crosslinking. U.S. Pat. Nos. 3,058,944; 3,336,268; and 3,530,108 disclose the reaction of certain poly(sulfonyl azide) compounds with isotactic polypropylene and other polyolefins by nitrene insertion into C—H bonds. More recently, sulfonyl azides have been found useful in modifying the rheology of certain polyolefins as disclosed in U.S. application Ser. Nos. 60/057,713 and 60/057,677, filed on Aug. 27, 1997; U.S. application Ser. Nos. 09/129,163, 09/129,161 and 09/129155 file on Aug. 5, 1998; U.S. application Ser. No. 09/140,603 fled on Aug. 26, 1998 and U.S. application Ser. No. 09/133,244 filed on Aug. 13, 1998; each of which is hereby incorporated herein by reference in its entirety. The result of reacting a sulfonyl azide with a polyolefin is the coupling of one polymer chain to another via a sulfonamide linkage. When polymer chains are thus coupled or linked, they are referred to as coupled or chain coupled polymers, and as rheology modified polymers.

As used herein, the term "rheology modified" refers to a change in the resistance of the molten polymer to flow. The resistance to flow is indicated by (1) the tensile stress growth coefficient and (2) the dynamic shear viscosity coefficient. The tensile stress growth coefficient is measured during start-up of uniaxial extensional flow as described by J. Meissner in Proc. XIIth International Congress on Rheology, Quebec, Canada, August 1996, pages 7–10 and by J. Meissner and J. Hostettler, Rheol. Acta, 33, 1–21 (1994). The dynamic shear viscosity coefficient is measured with small-amplitude sinusoidal shear flow experiments as described by R. Hingmann and B. L. Marczinke, J. Rheol. 38(3), 573–87, 1994.

Polymer compositions have also been rheology modified using nonselective chemistries involving free radicals generated by peroxides or high energy radiation. Although these techniques are useful for polyethylene, free radical generation at elevated temperatures tend to degrade the molecular weight of polymers such as polypropylene and polystyrene, due to the high rate of chain scission reactions along the polymer backbone.

Therefore, previous coupling technologies have been ineffective at high temperatures, e.g.>250° C., due to the formation of undesirable amounts of free radicals and/or decomposition. There remains a need for successful coupling of polymers which are typically processed at temperatures above 250° C., without degradation or crosslinking of the polymer.

SUMMARY OF THE INVENTION

The present invention is directed to a process for preparing a coupled or rheology modified polymer comprising contacting a polymer with a cyclic phosphazene azide at a temperature which is at least the decomposition temperature of the cyclic phosphazene azide, typically at temperatures above 200° C. Other aspects of the present invention are directed to a composition comprising a rheology modified polymer prepared by coupling the polymer using a cyclic phosphazene azide, blends thereof, and articles produced therefrom.

This process utilizing cyclic phosphazene azides allows for high temperature coupling of polymer chains without significant crosslinking or polymer degradation.

DETAILED DESCRIPTION OF THE INVENTION

The present invention is a process for producing a rheology modified polymer comprising contacting a polymer with a cyclic phosphazene azide at a temperature which is at least the decomposition temperature of the cyclic phosphazene azide. When the cyclic phosphazene azide reacts with the polymer, at least two separate polymer chains are advantageously joined and the molecular weight of the polymer chain is increased. In the preferred case when the cyclic phosphazene azide has only two azide groups, two distinct polymer chains are advantageously joined.

Cyclic phosphazene azide compounds useful for the process of the present invention include azides of the formula $P_3N_3(R)_n(N_3)_{6-n}$, wherein n is an integer from 2 to 4, and R is a $C_1$ to $C_{20}$ alkoxy, a $C_6$ to $C_{20}$ phenoxy, a $C_2$ to $C_{20}$ dialkylamine, or a $C_{12}$ to $C_{20}$ diarylamine, any of which can be additionally substituted with additional functional groups which do not interfere with the ability of the azide to act as a polymer coupling agent. Such substituents include but are not limited to a halo, nitro, amino, cyano, carbonyl or carboxyl functional group. In a specific preferred embodiment, R is an unsubstituted phenoxy group. Preferably n is 2, more preferably 3 and most preferably 4.

Cyclic phosphazene azides can be conveniently prepared by the reaction of sodium azide with the corresponding chloro-organocyclophosphazene in the presence of a catalytic amount of tetrabutylammonium bromide, in a refluxing solvent such as 2-butanone, toluene or THF, as described in "Synthesis and Reactivity of Alkoxy, Aryloxy, and Dialkylamino Phosphazene Azides, J. Am. Chem. Soc. 1999, 121, 884–885.

A polymer to be coupled utilizing the process of the present invention is advantageously a thermoplastic polymer, which has at least one C—H bond that can react with an azide. Such polymers include homopolymers or copolymers having narrow or broad (including bimodal) comonomer distribution as well as narrow or broad (including bimodal) molecular weight distribution, which is either a semi-crystalline hydrocarbon polymer having a melting point greater than 200° C., or an amorphous hydrocarbon polymer having a glass transition temperature of greater than 150° C. These polymers are normally processed at temperatures of from 200 to 400° C. without incurring any significant change in polymer chemical structure or weight average molecular weight (Mw).

In one preferred embodiment, the polymer is a syndiotactic vinyl aromatic polymer. As used herein, the term "syndiotactic" refers to polymers having a stereoregular structure of greater than 90 percent syndiotactic, preferably greater than 95 percent syndiotactic, of a racemic triad as determined by 13C nuclear magnetic resonance spectroscopy.

Syndiotactic vinyl aromatic polymers are homopolymers and copolymers of vinyl aromatic monomers, that is, monomers whose chemical structure possess both an unsaturated moiety and an aromatic moiety. The preferred vinyl aromatic monomers have the formula

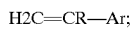

H2C=CR—Ar;

wherein R is hydrogen or an alkyl group having from 1 to 4 carbon atoms, and Ar is an aromatic radical of from 6 to 10 carbon atoms. Examples of such vinyl aromatic monomers are styrene, alpha-methylstyrene, ortho-methylstyrene, meta-methylstyrene, para-methylstyrene, vinyl toluene, para-t-butylstyrene, vinyl naphthalene, divinylbenzene and the like. syndiotactic polystyrene is the currently preferred syndiotactic vinyl aromatic polymer. Typical polymerization processes for producing syndiotactic vinyl aromatic polymers are well known in the art and are described in U.S. Pat. Nos. 4,680,353, 5,066,741, 5,206,197 and 5,294,685, which are incorporated herein by reference.

In another preferred embodiment, the polymer is a hydrogenated aromatic polymer such as polyvinylcyclohexane. Hydrogenated aromatic polymers include any polymeric material containing a pendant aromatic functionality which is subsequently hydrogenated. Pendant aromatic refers to a structure wherein the aromatic group is a substituent on the polymer backbone and not embedded therein. Preferred aromatic groups are C6–20 aryl groups, especially phenyl. These polymers may also contain other olefinic groups in addition to the aromatic groups. Preferably, the polymer is derived from a monomer of the formula:

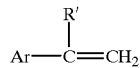

wherein R' is hydrogen or alkyl, Ar is phenyl, halophenyl, alkylphenyl, alkylhalophenyl, naphthyl, pyridinyl, or anthracenyl, wherein any alkyl group contains 1 to 6 carbon atoms which may be mono or multisubstituted with functional groups such as halo, nitro, amino, cyano, carbonyl and carboxyl. More preferably Ar is phenyl or alkyl phenyl with phenyl being most preferred. Typical vinyl aromatic monomers which can be used include styrene, alpha-methylstyrene, all isomers of vinyl toluene, especially paravinyltoluene, all isomers of ethyl styrene, propyl styrene, vinyl biphenyl, vinyl naphthalene, vinyl anthracene and the like, and mixtures thereof. Homopolymers may have any stereostructure including syndiotactic, isotactic or atactic; however, atactic polymers are preferred. In addition, hydrogenated copolymers containing these aromatic monomers including random, pseudo random, block and grafted copolymers may be used in accordance with the present invention. For example, copolymers of vinyl aromatic monomers and comonomers selected from nitriles, acrylates, acids, ethylene, propylene, maleic anhydride, maleimides, vinyl acetate, and vinyl chloride may also be used such as styrene-acrylonitrile, styrene-alpha-methylstyrene and styrene-ethylene. Hydrogenated block copolymers of vinyl aromatic monomers and conjugated dienes such as butadiene, isoprene may also be used. Examples include styrene-butadiene, styrene-isoprene, styrene-butadiene-styrene and styrene-isoprene-styrene copolymers. Further examples of block copolymers may be found in U.S. Pat. Nos. 4,845,173, 4,096,203, 4,200,718, 4,210,729, 4,205,016, 3,652,516, 3,734,973, 3,390,207, 3,231,635, and 3,030,346. Blends of such hydrogenated polymers with other polymers including impact modified, grafted rubber containing aromatic polymers may also be used. Preferably, the hydrogenated aromatic polymer is polyvinylcyclohexane (PVCH) prepared by hydrogenating atactic polystyrene as described in U.S. Pat. No. 5,700,878, herein incorporated by reference.

In yet another embodiment, the polymer can be a cyclic-olefin-polymer or copolymer which is a polymerized or copolymerized cycloolefin monomer such as norbornene-type polymers as described in U.S. Pat. Nos. 5,115,041, 5,142,007, 5,143,979, all of which are incorporated herein by reference. The cycloolefin moiety may be substituted or unsubstituted. Suitable cycloolefin monomers include substituted and unsubstituted norbornenes, dicyclopentadienes, dihydrodicyclopentadienes, trimers of cyclopentadiene, tetracyclododecenes, hexacycloheptadecenes, ethylidenyl norbornenes and vinylnorbornenes. Substituents on the cycloolefin monomers include hydrogen, alkyl alkenyl, and aryl groups of 1 to 20 carbon atoms and saturated and unsaturated cyclic groups of 3 to 12 carbon atoms which can be formed with one or more, preferably two, ring carbon atoms. Generally speaking, the substituents on the cycloolefin monomers can be any which do not poison or deactivate the polymerization catalyst. Examples of preferred monomers include but are not limited to dicyclopentadiene, methyltetracyclo-dodecene, 2-norbornene, and other norbornene monomers such as 5-methyl-2-norbornene, 5,6-dimethyl-2-norbornene, 5-ethyl-2-norbornene, 5-ethylidenyl-2-norbornene, 5-butyl-2-norbornene, 5-hexyl-2-norbornene, 5-octyl-2-norbornene, 5-phenyl-2-norbornene, 5-dodecyl-2-norbornene, 5-isobutyl-2-norbornene, 5-octadecyl-2-norbornene, 5-isopropyl-2-norbornene, 5-p-toluyl-2-norbornene, 5-α-naphthyl-2-norbornene, 5-cyclohexyl-2-norbornene, 5-isopropenyl-2-norbornene, 5-vinyl-2-norbornene, 5,5-dimethyl-2-norbornene, tricyclopentadiene (or cyclopentadiene trimer), tetracyclopentadiene (or cyclopentadiene tetramer), dihydrodicyclopentadiene (or cyclopentene-cyclopentadiene co-dimer), methyl-cyclopentadiene dimer, ethyl-cyclopentadiene dimer, tetracyclododecene 9-methyl-tetracyclo[6,2,1,13,6O2,7]dodecene-4, (or methyl-tetracyclododecene), 9-ethyl-tetracyclo[6,2,1,13,6O2,7]dodecene-4, (or ethyl-tetracyclododecene), 9-hexyl-tetracyclo-[6,2,1,13,6O2,7]dodecene-4, 9-decyl-tetracyclo[6,2,1,13,6O2,7]dodecene-4, 9-decyl-tetracyclo[6,2,1,13,6O2,7]dodecene-4, 9,10-dimethyl-tetracyclo[6,2,1,13,6O2,7]dodecene-4, 9-methyl- 10-ethyl-tetracyclo[6,2,1,13,6O2,7]dodecene-4, 9-cyclohexyl-tetracyclo[6,2,1,13,6O2,7]dodecene-4, 9-chloro-tetracyclo[6,2,1,13,6O2,7]dodecene-4, 9-bromo-tetracyclo[6,2,1,13,6O2,7]dodecene-4, 9-fluorotetracyclo[6,2,1,1³,6O2,7]dodecene-4, 9-isobutyl-tetracyclo[6,2,1,13,6O2,7]dodecene-4, and 9,10-dichlorotetracyclo[6,2,1,13,6O2,7]-dodecene-4.

Polymers comprising two or more different types of monomeric units are also suitable. For example, copolymers of methyltetracyclododecane (MTD) and methylnorbornene (MNB) are especially suitable. More preferably, the polymers comprise three or more different types of monomeric units, e.g., terpolymers, including MTD, MNB and dicyclopentadiene (DCPD).

Ring opening metathesis polymers may also be used and include polymers prepared by metathesis ring opening (co) polymerization of a norbornene or tetracyclododecene, such as those described in JP-85/26,024 and U.S. Pat. No. 5,053, 471 which is incorporated herein by reference.

Optionally, the polymers to be coupled or rheology modified in the process of the present invention are blends of two or more polymers. Preferably, at least one polymer is a high temperature semi-crystalline or amorphous thermoplastic as previously defined and the other polymer is an additional polymer which is processable at high temperatures and is generally an elastomer, or mixture thereof. Each polymer in the blend can be independently selected from the polymers described above. More preferably, at least one of the polymers is a syndiotactic vinyl aromatic polymer or a hydrogenated aromatic polymer and at least one other polymer can be chosen from polymers such as ethylene/alpha-olefin random copolymers, hydrogenated styrene/butadiene block copolymers, ethylene-styrene interpolymers, and the like.

The process of preparing a rheology modified polymer, comprises (a) contacting a polymer and a rheology modifying amount of a cyclic phosphazene azide at a temperature, referred to hereafter as a reaction temperature, which is at least the decomposition temperature of the cyclic phosphazene azide.

Those skilled in the art recognize that the reactivity, the cyclic phosphazene azide and the desired or predetermined rheology or desired amount of chain coupling will determine the amount of cyclic phosphazene azide to be used for rheology modification of the polymer. Determining this amount is within the skill in the art. In the practice of the invention, formation of crosslinked networks is to be avoided because the resulting material would be intractable; therefore, cyclic phosphazene azide is preferably limited to that amount which results in chain coupled or rheology modified, (but not substantially crosslinked) polymer, which is preferably less than 0.5 weight percent, more preferably less than about 0.10 weight percent, most preferably less than about 0.05 weight percent cyclic phosphazene azide based on the total weight of polymer.

Crosslinking is determined by gel fraction wherein polymer is weighed, combined with a solvent in which it is known to be soluble, filtered, dried and weighted again to determine the insoluble crosslinked gel left behind. In the practice of the invention, the resulting polymers preferably have less than about 5 weight percent, more preferably less than about 2 weight percent, most preferably less than about 1 weight percent gel fraction based on the total weight of the polymer. The term "a rheology modifying amount" of cyclic phosphazene azide is used herein to designate that amount of cyclic phosphazene azide effective to theologically modify the polymer it reacts with, such that no more than 5 weight percent gel is formed. At least about 0.01 weight percent cyclic phosphazene azide is advantageously used to achieve measurable results, preferably at least 0.02 weight percent and most preferably at least 0.05 weight percent cyclic phosphazene azide based on total weight of polymer(s) is used.

The polymer and cyclic phosphazene azide can be suitably combined in any manner which results in the desired reaction thereof, preferably by mixing the cyclic phosphazene azide with the polymer under conditions which allow sufficient mixing before reaction, to avoid localized areas of high azide concentration which leads to crosslinking, followed by subjecting the resulting admixture to a temperature sufficient for reaction. The term 'substantially uniform admixture' refers to a combination of azide and polymer in which the distribution of cyclic phosphazene azide in the polymer is sufficiently homogeneous. If the cyclic phosphazene azide is in the form of a solid, such as a powder, the powder can be mixed with solid polymer pellets using a tackifying oil such as silicone oil, or mineral oil, prior to reaction. Alternatively, the solid azide can be dissolved in a solvent and mixed with solid polymer pellets, followed by solvent evaporation. If the cyclic phosphazene azide is in the form of a liquid, the azide can be coated onto solid polymer pellets or mixed with molten polymer. Mixing can be achieved by a variety of methods including static melt mixing or a continuous melt mixer such as an extruder.

In another embodiment, the cyclic phosphazene azide is mixed with the polymer in the form of a concentrate. The concentrate can be a cyclic phosphazene azide in a liquid form, slurry or other admixture with a liquid which does not require removal from the polymer, hereinafter referred to as diluent. A diluent is preferably is a compound which does not interfere undesirably with subsequent process steps applied to the resulting polymer composition. To that end, the diluent differs from a solvent in being non-volatile (no more than 5 percent vapor pressure) at temperatures encountered in subsequent process steps, including decomposition of the coupling agent (that is up to about 300° C.) such that increased pressure or other means is not required for its control in subsequent steps. Preferably, the diluent is compatible with the polymer to be coupled so as not to degrade the properties of the coupled polymer. The diluent is preferably a liquid at room temperature or a low melting (that is having a melting point below about 50° C.) solid at room temperature. Diluents are preferably non-polar compounds in which the coupling agent is sufficiently miscible. Such diluents include, but are not limited to, mineral oil, aliphatic carboxylic acid esters, preferably of at least about 12 carbon atoms, more preferably of less than about 200 carbon atoms; paraffinic, naphthenic, or aromatic oil having a boiling point greater than about 230° C., but preferably liquid at 20° C., wherein mineral oil is most preferred.

Alternatively, a concentrate can be prepared by forming a pre-mix of a first polymer and a cyclic phosphazene azide, preferably at a temperature less than the azide decomposition temperature, preferably by melt blending, and then forming a second admixture by combining the first admixture with additional polymer or a second polymer. The first polymer used in the concentrate preferably has a melting point below about 110° C. or a melt index (I2) of at least about 0.25 g/10 min., preferably 1 g/10 min or greater. Such polymers include, for instance, ethylene alpha-olefin copolymers, especially where the alpha olefins are of 3 to 20 carbons, and have a density range of at least 0.855 g/cc, and up to 0.955 g/cc, more preferably up to 0.890 g/cc, and a melt index (I2) of at least 0.5 g/10 min., more preferably at least 5, but preferably less than 2000 g/10 min., more preferably less than 1000 g/10 min., and most preferably less than 100 g/10 min. Similarly, ethylene acrylic acid, ethylene vinyl acetate and ethylene/styrene interpolymers having a melting temperature of less than about 150° C., preferably less than about 130° C. can also be used.

Hereinafter, in both cases, the admixture containing azide (with either the diluent or the first polymer or a combination thereof) is referred to as a "concentrate." A polymer concentrate is preferred. Concentrates are especially preferred when temperatures are sufficiently high to result in loss of azide by evaporation or decomposition. Alternatively, some coupling may occur during the blending of the first polymer and azide, but some of the azide remains unreacted until the concentrate is blended into the second polymer composition. In a preferred embodiment, the first polymer is miscible with a second different polymer, as in a concentrate of an azide and a low molecular weight polystyrene mixed at a temperature well below 200° C., which is then combined with a syndiotactic polystyrene.

The concentrate is conveniently blended with the polymer to be coupled in any form, including molten, powder, pellets and the like, but is preferably dry blended with pelleted polymer or molten concentrate is injected into molten polymer, wherein the molten polymer is preferably directly from, or in a polymerization reactor.

Optionally, the concentrate is formed on the surface of a polymer to be coupled. For instance, a diluent, e.g. mineral oil, is coated on a polymer, preferably in pelleted or powdered form. Then the coupling agent is admixed with the diluent coated polymer. Thus, steps of the process of the invention suitably occur in any order that results in a sufficiently uniform admixture of concentrate and polymer (s) to substantially avoid localized concentrations of coupling agent.

The decomposition temperature of the cyclic phosphazene azide is the temperature at which the azide converts to phosphazene nitrene, eliminating nitrogen and heat in the process, specifically the peak decomposition temperature, as determined by differential scanning calorimetry (DSC). For instance, a differential scanning calorimeter (DSC) thermogram of $P_3N_3(OC_6H_5)_3(N_3)_3$ shows no change in the heat flow until a exothermic peak is observed that begins at about 225° C., peaks at 263° C. (referred to herein as the peak decomposition temperature), and is complete by 300° C. The peak decomposition temperature is advantageously greater than about 150° C., preferably greater than about 200° C., and more preferably greater than about 220° C.

The process of the present invention can be used during melt processing of the polymer to be coupled or rheology modified. The term "melt processing" refers to any process in which the polymer is softened or melted, such as extrusion, pelletizing, molding, thermoforming, film blowing, compounding in polymer melt form, fiber spinning, and the like. The mixing of polymer and azide or concentrate is preferably attained with the polymer in a molten or melted state, that is above the softening temperature, or in a dissolved or finely dispersed condition rather than in a solid mass or particulate form. The molten or melted form is more preferred because of the absence of solvent to be removed.

To avoid the extra step and resultant cost of re-extrusion and to ensure that the azide is well blended into the polymer, it is preferred that the azide be added to the post-reactor area of a polymer processing plant. For example, the azide is added in either powder or liquid form to the powdered polymer after the solvent is removed by decantation and prior to the drying and densification extrusion process. In an alternative embodiment, when polymers are prepared in a gas phase process, the azide is preferably added in either powder or liquid form to the powdered polymer before the densification extrusion. In an alternative embodiment when a polymer is made in a solution process, the azide is preferably added to the polymer solution or to a devolatilized polymer melt prior to the densification extrusion process.

Those skilled in the art recognize that a polymer or mixture thereof melts over a range of temperatures rather than melting sharply at one temperature. In the process of the present invention, it is sufficient that the polymer be in a partially melted state, recognized by the formation of a substantially uniform admixture as previously defined. For convenience, the temperature of this degree of melting can be approximated from the differential scanning calorimeter (DSC) curve of the polymer or mixture thereof to be treated. The temperature necessary for forming a substantially uniform admixture is facilitated by comparing a DSC curve of melt flow vs. temperature of a polymer with the cyclic phosphazene azide of interest to find the reaction profile of the cyclic phosphazene azide and a DSC curve of the polymer in which the cyclic phosphazene azide is to be used. For instance, the reaction temperature profile of $P_3N_3$ $(OC_6H_5)_3(N_3)_3$ shows an onset of reaction above about 225° C. with a peak decomposition temperature about 263° C. Thus, polymers can be mixed into a substantially uniform admixture with the cyclic phosphazene azide at temperatures between the softening temperature (as indicated by the onset of softening in the DSC curve) and melt temperature (where melting is complete) before reaching the decomposition temperature of the cyclic phosphazene azide. Conveniently the formation of a substantially uniform admixture can occur along a temperature profile within processing equipment, such as an extruder.

The process of the present invention preferably includes, at least three temperatures including the mixing and reaction temperatures, which are preferably between about 150° C. and 300° C., wherein each temperature differs from the others by at least 5° C. At least one reaction temperature is at least 5° C. above the decomposition temperature of the cyclic phosphazene azide, at least one mixing temperature is at least 5° C. above the softening temperature of the polymer and at least 5° C. below the decomposition temperature of the cyclic phosphazene azide, wherein all three temperatures can occur within a single vessel.

Any equipment can be suitably used for mixing, preferably equipment which provides sufficient mixing and temperature control within the same vessel. Advantageously, the practice of the invention takes place in such devices as an extruder, melt mixer, pump conveyor or other polymer mixing device such as a Brabender melt mixer. The term 'extruder' is used for its broadest meaning to include devices which extrudes pellets, or a pelletizer.

Preferably the equipment allows a sequence of temperatures or zones having different temperatures therein. The reaction is especially suitable for an extruder such that the process of the present invention can occur within a single vessel, wherein sufficient mixing occurs at a softening temperature of the polymer, before the polymer is exposed to the peak decomposition temperature of the cyclic phosphazene azide. Conveniently, when there is a melt extrusion step between production of the polymer and its use, at least one step of the process of the invention can occur in the melt extrusion step. While it is within the scope of the invention that the reaction take place in a solvent or other medium, it is preferred that the reaction be in a bulk phase to avoid later steps for removal of the solvent or other medium. For this purpose, a polymer above the softening temperature is advantageous for even mixing and for reaching a reaction temperature (the decomposition temperature of the cyclic phosphazene azide).

The reaction vessel preferably has at least two zones of different temperatures into which a reaction mixture would pass, the first zone advantageously being at a temperature at least the softening temperature of the polymer(s) and preferably less than the decomposition temperature of the cyclic phosphazene azides and the second zone being at a temperature sufficient for decomposition of the cyclic phosphazene azide. The first zone is preferably at a temperature sufficiently high to soften the polymer and allow it to combine with the cyclic phosphazene azide through distributive mixing to a substantially uniform admixture.

The term "profile" is used herein to mean a series of temperatures to which the polymer is exposed, each temperature being at least about 5° C., preferably at least about 10° C. higher than the preceding temperature. The profile preferably comprises at least one temperature which is at least the softening temperature of the polymer and at least one temperature which is at least the decomposition temperature of the cyclic phosphazene azide. More preferably, the profile comprises at least 3, most preferably at least 4 such temperatures, wherein in addition to the softening temperature and decomposition temperature, the polymer is exposed to a temperature between those temperatures, and to at least one temperature above the decomposition temperature of the cyclic phosphazene azide. Preferably, at least one temperature is at least 5, most preferably at least 10, even more preferably at least 15° C. above the azide decomposition temperature. In the description of this invention, when temperatures are described in terms of the softening or decomposition temperatures, the temperatures refer to the polymer stream temperatures, that is temperatures inside the polymer stream or polymer melt rather than the temperatures of the equipment. It is known in the art that the polymer melt (stream) temperature is advantageously close to the machine set temperature in the initial zones of an extruder, but the polymer melt (stream) temperature can often be greater than the machine set temperatures in the latter zones of the extruder as it approaches the exit die of the extruder due to mechanically induced shear heating.

A temperature, which is at least the decomposition temperature of the azide, is maintained for a time sufficient to result in decomposition of at least sufficient cyclic phosphazene azide to avoid later undesirable reaction. Preferably at least about 80, more preferably at least about 90, most preferably at least about 95 weight percent of the cyclic phosphazene azide is reacted. Those skilled in the art realize that this time is dependent on whether the temperature is one at which the azide slowly decomposes or one at which it rapidly decomposes. For convenience, the temperatures are selected such that the times are preferably less than about 5 minutes, more preferably less than about 3 minutes. However, it is also preferable that the times be at least about 1 minute, more preferably at least about 2 minutes to avoid unreacted cyclic phosphazene azide in the polymer product and subsequent undesirable reactions, or to avoid the need for inconvenient, possible destructive high temperatures.

Blends of the present invention are referred to herein as chain coupled, reactively coupled or coupled blends. Coupling of the polymers within the blend is achieved by the same process as is used for a single polymer. For instance, a blend is advantageously mixed with a cyclic phosphazene azide above the softening temperature of at least one component of the blend, most preferably below the decomposition temperature of the cyclic phosphazene azide, and the resulting mixture is preferably raised to at least the decomposition temperature of the cyclic phosphazene azide. As in the case of a single polymer, application of the practice of the invention to blends advantageously involves forming a substantially uniform admixture of polymers and cyclic phosphazene azide before decomposition of the cyclic phosphazene azide, although in the case of blends where there are dispersed and continuous phases, it is sufficient that the cyclic phosphazene azide be dispersed at the interface of the phases rather than uniformly distributed in particularly the dispersed phase unless chain coupling of the dispersed phase itself is desired. Most preferably, the cyclic phosphazene azide and resulting coupling is distributed primarily at the interface of the different polymers. Distribution primarily at the interface is advantageously achieved by adding the polyazide after the two immiscible polymers have been mixed to the extent that a minimum dispersed polymer particle size has been achieved. This allows for the maximum amount of interfacial surface area to be available for reaction of the polyazide.

Where there are dispersed and continuous phases, it is most preferable, but not necessary, to add the cyclic phosphazene azide after the blend of two or more polymers is well mixed, i.e. at a point when the particle size of the dispersed polymer has reached the smallest size practically attainable on the particular mixing devise being used. At least one of the blend polymer components is preferably at least at its softening temperature. More preferably mixing occurs or is continued when the blend is at a temperature sufficient for the cyclic phosphazene azide to react to form a reactive species believed to be a singlet nitrene capable of inserting into carbon-hydrogen bonds, that is at its decomposition temperature. This allows for optimum reaction at the interface between the two polymers. While it is preferred that mixing of the blend and cyclic phosphazene azide precede a temperature increase to the decomposition temperature, alternatively, mixing can occur at or above the decomposition temperature of the cyclic phosphazene azide. Concentrates are used alternatively or with the mixing of the azide with a melted blend.

Advantageously, chain coupled polymers behave rheologically, similar to branched polymers of corresponding composition which have branches of at least about 20 carbon atoms. For instance, the solution viscosity (or intrinsic viscosity) increases with molecular weight and the melt flow rate increases. Thus, in the practice of the invention, linear polymers are converted to polymers having non-linear chains. The resulting polymer is obtained as a solid thermoplastic polymer, advantageously having a low shear melt viscosity at least as great as that of the starting material and a melt strength greater than that of the starting material. Advantageously the resulting polymer has a weight average molecular weight greater than that of the linear polymer starting material (before inter-chain coupling), preferably at least about 5 percent greater, more preferably at least about 10 percent greater, most preferably at least about 20 percent greater. The resulting polymer advantageously has chain coupling of long polymer chains, that is chains of at least about 20 carbon atoms, as evidenced by the rheology changes. In the embodiment of the invention wherein the polymer starting material(s) have tacticity, coupling of long polymer chains is preferably of chains having the same stereoisometric structure as the backbone, that is, isotactic chains to isotactic chains, syndiotactic chains to syndiotactic polymers and atactic chains to atactic polymers for the purposes of maintaining desired properties associated with each stereoisometric structure. However, in the case where this invention is practiced on blends of two or more polymers of differing tacticity, the coupling of polymer chains of different tacticity may be desirable from an end-use standpoint (e.g. to obtain broadened melting point range, toughness, etc.)

The invention also includes a composition prepared by the process of the invention in any of its embodiments, wherein the composition comprises at least one rheology modified polymer, including rheology modified blends, made by a process comprising contacting a polymer and a rheology modifying amount of a cyclic phosphazene azide at a temperature, referred to hereafter as a reaction temperature, which is at least the decomposition temperature of the cyclic phosphazene azide. The composition has a higher melt strength in extensional flow or easier melt flow at high shear rate, compared to a polymer of the same weight average molecular weight (Mw) having linear chains and the same composition, except for the coupled chains; as well as a wider temperature range for thermoforming or higher crystallization temperature.

Articles formed from any composition of the invention, especially thermoformed, injection molded, extruded, cast, blow molded, blown, foamed or molded articles; or foams, films or fibers, are also aspects of the present invention.

The invention additionally includes a process of producing a rheology modified polymer comprising contacting at least one polymer with a cyclic phosphazene azide within a single vessel, wherein the contact includes mixing at a temperature which is at least the softening temperature of the polymer, but is preferably below the decomposition temperature of the cyclic phosphazene azide, and is preferably followed by, exposure to at least one temperature at which the cyclic phosphazene azide decomposes. The vessel is preferably an extruder. The polymer is preferably melted or molten form.

Alternatively, the cyclic phosphazene azide is useful in any process taught in the prior art for use of other reactive azides, particularly those uses taught for poly(sulfonyl azide), most particularly for the uses and in the processes taught in copending applications: U.S. application Ser. Nos. 60/057,713 and 60/057,677, filed on Aug. 27, 1997; U.S. application Ser. Nos. 09/129,163, 09/129,161 and 09/129,155 filed on Aug. 5, 1998; U.S. application Ser. No. 09/140,603 fled on Aug.26, 1998 and U.S. application Ser. No. 09/133,244 filed on Aug. 13, 1998, all of which are incorporated herein. Specifically, the method can be applicable to polymers such as polyolefins, including polypropylenes.

The following examples are used to illustrate the present invention and should not be considered limiting. Ratios, parts, and percentages are by weight unless otherwise stated.

In these examples and as otherwise referred to herein, gel permeation chromatography (GPC) is conducted according to the following procedure:

The analysis is conducted using a Waters 150° C. high temperature size exclusion chromatography instrument.

Sample Prep:
15±1.0 mg of the syndiotactic polystyrene (SPS) sample is dissolved in 13.0 ml of TCB (trichlorobenzene) containing 300 ppm w/w (weight/weight) 2,6-di (tertiary-butyl)4-methylphenol commercially available from Shell Chemical Company under the trade designation Ionol. The solutions are shaken at 160° C. for 2 hours. The hot solutions are filtered using a 0.5 micron stainless steel filter.

The above is repeated for polyvinylcyclohexane (PVCH) samples except that tetrahydrofuran is used as the solvent and the solutions are shaken at 25° C. for 2 hours.

Pump:
Flow rate of 1.1 ml/min. nominal, at a temperature of 60° C. for SPS samples.

Flow rate of 1.0 ml/min. nominal, at a temperature of 60° C. for PVCH samples.

Eluent:
Fisher HPLC grade 1,2,4-trichlorobenzene with 200 ppm w/w Ionol for SPS samples.
Fisher HPLC grade tetrahydrofuran with 200 ppm w/w Ionol for PVCH samples.

Injector:
Inject 150 microliters, at a temperature of 135° C. for SPS samples.
Inject 75 microliters, at a temperature of 135° C. for PVCH samples.

Columns:
3 columns commercially available from Polymer Laboratories under the trade designations: SN 10M-Mixed B-87-130, SN 10M-Mixed B-87-132, and SN 10 M-Mixed B-103-37, heated to 135° C. for SPS samples.
Column of PLGel Mixed-C 5 $\mu$ commercially available from Polymer Laboratories PVCH samples.

Detection:
Refractive Index Detector with a sensitivity of 32 and a scale factor of 10.

Data system:
commercially available from Polymer Laboratories under the trade designation Caliber GPC/SEC, version 6.0.

Calibration:
A polystyrene/polypropylene universal calibration is carried out using narrow molecular weight distribution polystyrene standards from Polymer Laboratories with Ionol as the flow marker for the SPS samples.

| PS | k = 12.6e-5 | a = 0.702 |
|---|---|---|
| Polypropylene | k = 14.2e-5 | a = 0.746 |

Calibration for PVCH samples uses a narrow molecular weight polystyrene standard.

The cyclic phosphazene azides are prepared by the reaction of sodium azide with the corresponding chloro-organocyclophosphazene in the presence of a catalytic amount of tetrabutylammonium bromide, as described in "Synthesis and Reactivity of Alkoxy, Aryloxy, and Dialkylamino Phosphazene Azides, *J. Am. Chem. Soc.* 1999, 121, 884–885.

EXAMPLE 1

A 40 g sample of syndiotactic polystyrene (SPS) (Mw= 193,000 and Mw/Mn=2.26) available from The Dow Chemical Company and 0.10 g of a phenolic stabilizer, commercially available from Ciba Geigy under the trade designation Irganox™ 1010, are added to a Brabender mixer at 290° C. and allowed to melt and mix. To this mixture is added 0.111 g of $[P_3N_3(OPh)_3(N_3)_3]$ as a liquid. The resulting admixture is reacted for 5 min at 290° C. and at a paddle speed of 80 rpm (revolutions per minute). The product is removed from the mixing bowl, cooled to approximately 25° C. and then characterized using gel permeation chromatography (GPC).

Comparative Sample A
The process of Example 1 is followed except that the phosphazene azide is omitted from the procedure.

Comparative Sample B
The process of Example 1 is followed except that 0.100 g of 4,4'-bis-sulfonylazido diphenyloxide is used as the coupling agent in place of the cyclic phosphazene azide.

The results of the GPC analysis are included in Table I.

TABLE I

| Sample | Mw | Mw/Mn |
|---|---|---|
| SPS starting material | 193,000 | 2.26 |
| Example 1 | 202,000 | 4.19 |
| Comparative Sample A | 120,000 | 2.17 |
| Comparative Sample B | 92,000 | 2.44 |

The phosphazene azide increases the molecular weight of SPS at a relatively high processing temperature, whereas the Comparative Sample A, where no coupling agent is used and Comparative Sample B, where a sulfonyl azide coupling agent is used are lower in Mw.

EXAMPLE 2

A 40 g sample of polyvinylcyclohexane (Mw=266,400 and Mw/Mn=2.11) prepared according to the method described in U.S. Pat. No. 5,700,878 is placed in a Brabender melt mixer along with 0.05 g of a hindered phenolic stabilizer commercially available from Ciba Geigy under the trade designation Irganox™ B-225 and melt mixed at 280° C. To this is added 0.105 g of $[P_3N_3(OPh)_3(N_3)_3]$. The polymer and phosphazene azide are reacted at 280° C. for 5 min at a mixing speed of 80 rpm. The product is removed, cooled and analyzed by GPC.

Comparative Sample C

The process of Example 2 is repeated except that the phosphazene azide coupling agent is omitted.

The results of the GPC analysis are listed in Table 2.

TABLE 2

| Sample | Mw | Mw/Mn |
|---|---|---|
| PVCH original material | 266,400 | 2.11 |
| Example 2 | 375,500 | 4.99 |
| Comparative Example 2 | 157,700 | 2.37 |

Again, the significant increase in molecular weight of Example 2 vs. Comparative Example 2 indicates that this polymer is coupled at 280° C. by the phosphazene azide.

We claim:

1. A process for preparing a rheology modified polymer comprising contacting a polymer with a cyclic phosphazene azide compound of the formula:

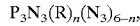

$$P_3N_3(R)_n(N_3)_{6-n},$$

wherein n is an integer from 2 to 4, and R is a $C_1$ to $C_{20}$ alkoxy, a $C_6$ to $C_{20}$ phenoxy, a $C_2$ to $C_{20}$ dialkylamine, or a $C_{12}$ to $C_{20}$ diarylamine group at a temperature which is at least the decomposition temperature of the cyclic phosphazene azide.

2. The process of claim 1 wherein n is 2.

3. The process of claim 1 wherein n is 3.

4. The process of claim 1 wherein n is 4.

5. The process of claim 1 wherein R is a $C_6$ to $C_{20}$ phenoxy group.

6. The process of claim 5 wherein R is a $C_6$ phenoxy group.

7. The process of claim 6 wherein n is 3.

8. The process of claim 1 wherein the temperature is at least 200° C.

9. The process of claim 1 wherein the temperature is between 200 and 400° C.

10. The process of claim 1, wherein the polymer is syndiotactic polystyrene.

11. The process of claim 1, wherein the polymer is polycyclohexylethylene.

12. The process of claim 1, wherein the polymer is a polymer blend of at least two polymers.

13. The process of claim 1, wherein less than 0.5 wt. % of cyclic phosphazene azide is present, based on the total weight of the polymer.

14. The process of claim 1, wherein less than 0.10 wt. % of cyclic phosphazene azide is present, based on the total weight of the polymer.

15. The process of claim 1, wherein the contact includes mixing at a temperature which is at least the softening temperature of the polymer, but is below the decomposition temperature of the cyclic phosphazene azide, followed by exposure to at least one temperature at which the cyclic phosphazene azide decomposes, within a single vessel.

16. The process of claim 15 wherein the vessel is an extruder.

17. A coupled polymer composition produced from the process of claim 1.

18. An article produced from the coupled polymer composition of claim 17.

* * * * *